Oct. 30, 1934.  J. F. COOMBS ET AL  1,978,486
RIMLESS EYEGLASS MOUNTING
Filed May 23, 1932
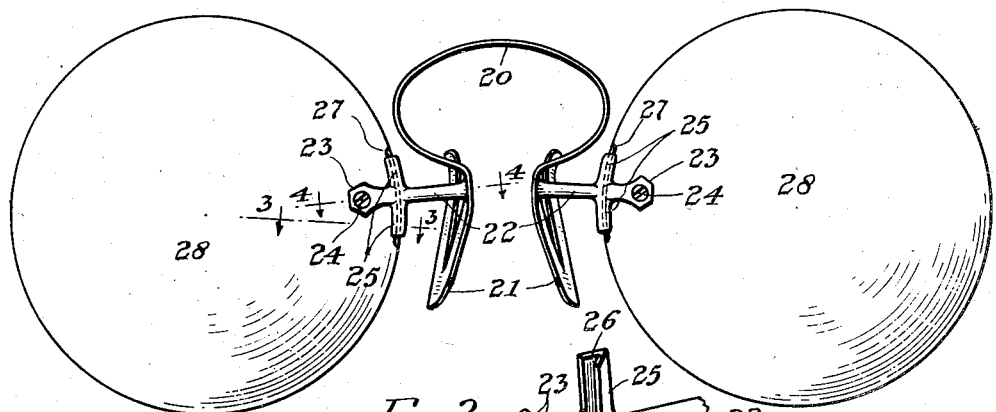
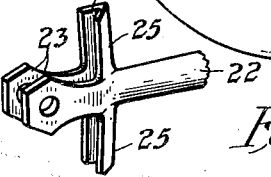
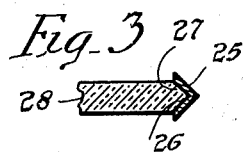
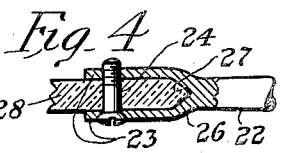
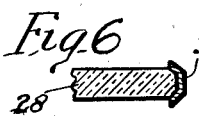
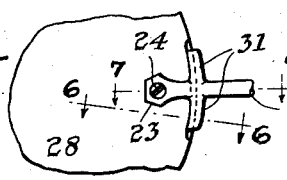
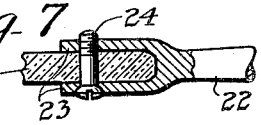
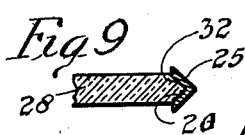
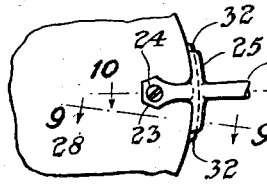
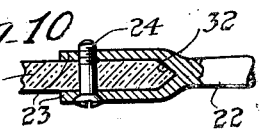
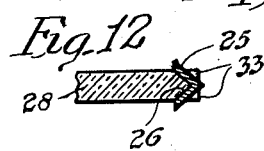
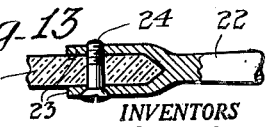
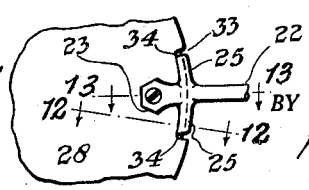
INVENTORS
James F. Coombs
Almer Coe
Brayton Richards
ATTORNEY.

Patented Oct. 30, 1934

1,978,486

UNITED STATES PATENT OFFICE 1,978,486

RIMLESS EYEGLASS MOUNTING

James F. Coombs, Des Plaines, and Almer Coe, Chicago, Ill., assignors to Almer Coe & Company, Chicago, Ill., a corporation of Illinois Application May 23, 1932, Serial No. 612,926

2 Claims. (Cl. 88—47)

The invention relates to improvements in rimless eyeglass mountings and has for its primary object the provision of an improved construction of the character indicated which is capable of economical manufacture and highly efficient in use.

Another object of the invention is the provision of a mounting of the character indicated specially constructed and arranged to prevent loosening of the lenses in the mounting.

Other objects will appear hereinafter.

The invention consists in the combinations and arrangements of parts hereinafter described and claimed.

The invention will be best understood by reference to the accompanying drawing forming a part of this specification, and in which Fig. 1 is a front view of a pair of rimless eyeglasses constructed in accordance with the invention;

Fig. 2 a perspective view of the outer portion of one of the lens securing posts employed in said construction;

Fig. 3 an enlarged detailed section taken substantially on line 3—3 of Fig. 1;

Fig. 4 an enlarged detailed section taken substantially on line 4—4 of Fig. 1;

Fig. 5 a detailed view of another modified form of construction;

Fig. 6 an enlarged detailed section taken substantially on line 6—6 of Fig. 5;

Fig. 7 an enlarged detailed section taken substantially on line 7—7 of Fig. 5;

Fig. 8 a detailed view of another modified form of construction;

Fig. 9 an enlarged detailed view taken substantially on line 9—9 of Fig. 8;

Fig. 10 an enlarged detailed view taken substantially on line 10—10 of Fig. 8;

Fig. 11 a detailed view of another modified form of construction;

Fig. 12 an enlarged detailed section taken substantially on line 12—12 of Fig. 11; and Fig. 13 an enlarged detailed section taken substantially on line 13—13 of Fig. 11.

The embodiment of the invention illustrated in Figs. 1, 2 and 3 of the drawing consists of a rimless eyeglass mounting of conventional form comprising a suitable spring 20, nose pieces 21, supporting posts 22 bifurcated at their ends to form securing ears 23 for the passage of securing screws 24. So much of the construction as has been already described constitutes a usual and conventional form of eye glass mounting and constitutes no part of our present invention except insofar as the same cooperates with the features to be presently described.

Arranged at the base of the supporting ears 23 are two novel tongues or braces 25 which are of angular or channeled form or configuration, as best shown in Fig. 2. The channel 26 of the tongues 25 is preferably acutely V-shaped as indicated, and the adjacent edge 27 of the corresponding eyeglass lens 28 is correspondingly beveled and shaped to fit snugly within the V-shaped channel 26, as indicated.

By this arrangement, an engagement with the edge of the eye glass lens is effected which will not readily loosen in ordinary usage. It will be noted that by forming the tongues 25 in channel or angular form, the same are greatly stiffened against radially bending so that when the strain is applied to the lenses 28, as it always is in fitting the glasses to the nose of the wearer, there will be no yielding of the tongues 25, and therefore no loosening of the fit between the lens and the tongues. Obviously, the maintaining of the tightness of the fit between the lens and the tongues will prevent the rocking of the lens on the screw 24, and this will prevent the loosening of said screw and the ultimate accidental removal of the lens from the mounting.

It is also to be noted that the fitting of the V-shaped edge 27 of the lens within the V-shaped channel 26 of the tongues prevents wabbling of the lens on the screw 24 to spread the ears 23 apart, thereby further loosening the mounting of the lens and also strengthening the edge of the lens to prevent breaking or cracking thereof during use.

In the modification illustrated in Figs. 5, 6 and 7, the tongues 31 are chamfered in form, as illustrated in Fig. 6, and the corresponding edge of the lens 28 correspondingly chamfered to fit within the channel. Obviously this arrangement will also give substantially the same results as that illustrated in Figs. 1, 2 and 3.

In the modification illustrated in Figs. 8, 9 and 10, each lens is provided with a V-shaped projection to fit within the V-shaped channels of the tongues 25. Obviously this arrangement also will accomplish substantially the same results as that shown in Figs. 1, 2 and 3.

In the modification illustrated in Figs. 11, 12 and 13, each lens is provided with a notch or recess 33 having a V-shaped bottom 34 to fit within the V-shaped channels in the tongues 25. Obviously also this arrangement will accomplish the same results as that shown in Figs. 1, 2 and 3.

By means of the constructions disclosed, a rimless eyeglass mounting may be provided which will preserve the tightness and snugness of the fit between the tongues of the mounting and the corresponding lens, thereby preventing loosening of the lens in the mounting and at the same time reinforcing and strengthening the lens at the juncture with the mounting. The specific forms and arrangements of parts disclosed are simple and effective ones for the purpose.

We have illustrated the invention as applied to a usual form of eyeglass supported entirely on the nose of the wearer, but the same construction may be used with good results in eyeglasses in spectacle form for attaching both the nose pieces and the posts or tines of the spectacles to the lenses. In each instance by means of the arrangement disclosed, a connection for the lenses will be afforded which will not readily work loose in use and will generally reinforce and strengthen the lenses at the junctures.

While we have illustrated and described the preferred forms of construction for carrying our invention into effect, these are capable of variation and modification without departing from the spirit of the invention. We, therefore, do not wish to be limited to the precise details disclosed, but desire to avail ourselves of such variations and modifications as fall within the scope of the appended claims.

We claim:

1. A rimless eyeglass mounting comprising a supporting frame member having a lens supporting post bifurcated to form ears embracing the lens and perforated for the reception of a securing element; tongues at the opposite sides of said post arranged to extend along and contact with the edges of the lens for material distances on each side of said post, said tongues being shaped to form grooves in their inner faces having outwardly converging flat sides; and a lens secured between said ears with its corresponding edges fitted into said grooves, said edges having outwardly converging flat sides snugly fitting the corresponding sides of said grooves, whereby the edges of said lens are engaged by said grooves at material distances from said post to reinforce the same against twisting thereon.

2. A rimless eyeglass mounting comprising a supporting frame having a lens supporting post bifurcated to form ears embracing the lens and perforated for the reception of a securing element; tongues at the opposite sides of said post arranged to extend along and contact with the edges of the lens for material distances on each side of said base, said tongues being shaped to form V-shaped grooves in their inner faces and the sides of said grooves being arranged at acute angles; and a lens secured between said ears with its edges fitting into said grooves, said edges being V-shaped in cross section to conform to and fit the sides of said grooves, whereby the edges of said lens are engaged by said grooves at material distances from said post to reinforce the same against twisting thereon.

JAMES F. COOMBS.
ALMER COE.